US006631863B2

United States Patent
Nawa (10) Patent No.: US 6,631,863 B2
(45) Date of Patent: Oct. 14, 2003

(54) REEL HUB LOCK RELEASING MECHANISM FOR USE IN A TAPE DRIVE THAT COMPRISES A SEESAW-TYPE RELEASE LEVER

(75) Inventor: Ikuichiro Nawa, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 135 days.

(21) Appl. No.: 10/002,851

(22) Filed: Nov. 1, 2001

(65) Prior Publication Data

US 2002/0056778 A1 May 16, 2002

(30) Foreign Application Priority Data

Nov. 10, 2000 (JP) ........................................ 2000-342922

(51) Int. Cl.$^7$ ............................................... G11B 23/04
(52) U.S. Cl. ...................... 242/338.1; 360/95; 360/137
(58) Field of Search .................... 242/338.1; 360/85, 360/95, 137

(56) References Cited

U.S. PATENT DOCUMENTS

| 5,414,585 A | 5/1995 | Saliba |
| 5,791,577 A | * 8/1998 | Lee ........................ 242/338.1 |
| 5,793,574 A | 8/1998 | Cranson et al. |
| 5,857,634 A | 1/1999 | Hertrich |
| 5,862,014 A | 1/1999 | Nute |
| 6,241,171 B1 | 6/2001 | Gaboury |

FOREIGN PATENT DOCUMENTS

| JP | 2000-100025 A | 4/2000 |
| JP | 2000-100116 A | 4/2000 |
| JP | 2000-149491 A | 5/2000 |
| WO | WO 86/07295 A1 | 12/1986 |
| WO | WO 86/07471 A1 | 12/1986 |

* cited by examiner

Primary Examiner—John Q. Nguyen
(74) Attorney, Agent, or Firm—Frishauf, Holtz, Goodman & Chick, P.C.

(57) ABSTRACT

In order to release a reel hub lock by operating a lock lever (41) in response to rotation of a ring cam (51), a reel hub lock releasing (30) mechanism comprises a seesaw-type release lever (31) rotatably disposed on a back surface of a chassis (12) around a fulcrum part (311) at a center thereof. The seesaw-type release lever comprises first and second plate bodies (312, 313) extending from the fulcrum part toward both sides. The first plate body has, at a tip thereof, an engaging projection (34) engaged with a cam groove (51a) of the ring cam. The second plate body has, at a tip thereof, a lever operating projection (33) which projects upward to operate the lock lever. Disposed around the fulcrum part, a spring (35) is for preventing a part from falling away to fit the seesaw-type release lever to the chassis.

4 Claims, 11 Drawing Sheets

REEL HUB LOCK RELEASING MECHANISM FOR USE IN A TAPE DRIVE THAT COMPRISES A SEESAW-TYPE RELEASE LEVER

BACKGROUND OF THE INVENTION

This invention relates to a tape drive for driving a tape cartridge such as a linear tape storage system represented by DLT (digital liner tape) or LTO (linear tape open) and, in particular, to a reel hub lock releasing mechanism for releasing lock of a reel hub in the tape cartridge.

Linear tape storage systems of the type described are developed as "back-up" systems for hard disks of computer systems and various types of the linear tape storage systems have been proposed in prior art. For example, a digital linear tape drive serving as the DLT is disclosed in U.S. Pat. No. 5,862,014 to Nute, entitled: "Multi-Channel Magnetic Tape Head Module Including Flex Circuit" or the like.

The digital linear tape drive (which may be merely called "driving apparatus", "tape drive", or "drive") is for receiving a tape cartridge (which may be merely called "cartridge") having a single reel (a supply reel) and contains a take-up reel therein. When the tape cartridge is installed in the driving apparatus, a magnetic tape is pulled out of the tape cartridge and then is wound by the take-up reel through a head guide assembly (HGA). The head guide assembly is for guiding the magnetic tape (which may be merely called "tape") pulled out of the tape cartridge in a magnetic head. The magnetic head exchanges information between the tape and the magnetic head. The head guide assembly generally comprises a boomerang-shaped aluminum plate and six large guide rollers each using a bearing.

In addition, the head guide assembly is also called a tape guide assembly which is disclosed, for example, in U.S. Pat. No. 5,414,585 to Saliba, entitled: "Rotating Tape Edge Guide." In addition, an example of the guide roller is disclosed in Japanese Unexamined Patent Publication Tokkai No. 2000-100025 or JP-A 2000-100025.

The tape drive is generally comprised of a rectangular housing that has a common base as described, for example, in U.S. Pat. No. 5,793,574, entitled: "Tape Head Actuator Assembly Having A Shock Suppression Sleeve" to Cranson et al. The base has two spindle motors (reel motors). The first spindle motor has a spool (or a take-up reel) permanently mounted on the base and the spool is dimensioned to accept a relatively high speed streaming magnetic tape. The second spindle motor (reel motor) is adapted to accept a removable tape cartridge. The removable tape cartridge is manually or automatically inserted into the drive via a slot formed on the drive's housing. Upon insertion of the tape cartridge into the slot, the cartridge engages the second spindle motor (reel motor). Prior to rotation of the first and the second spindle motors, the tape cartridge is connected to the permanently mounted spool (the take-up reel) by means of a mechanical buckling mechanism. A number of rollers (guide rollers) positioned intermediate the tape cartridge and the permanent spool guide the magnetic tape as it traverses at relatively high speeds back and forth between the tape cartridge and the permanently mounted spool.

In the digital linear tape drive having such a structure, an apparatus for pulling the tape from the supply reel to the take-up reel is required. Such as a pulling apparatus is disclosed, for example, in International Publication Number WO 86/07471. According to WO 86/07471, take up leader means (a first tape leader) is coupled to the take-up reel while supply tape leader means (a second tape leader) is connected to the tape on the supply reel. The first tape leader has one end formed into a mushroom like tab. The second tape leader has a locking aperture. The tab is engaged into the locking aperture.

Furthermore, a mechanism for joining or coupling the first tape leader with the second tape leader is required. Such a joining or coupling mechanism is disclosed, for example, in International Publication number WO 86/07295.

In addition, Japanese Unexamined Patent Publication Tokkai No. 2000-100116 or JP-A 2000-100116 discloses a structure of leader tape engaging part which can engage an end part of a leader tape (the second tape leader) to a tape end hooking part in a tape cartridge without requiring a tab projected in the side of the leader tape.

U.S. Pat. No. 5,857,634, entitled: "Take-up Reel Lock" to Hertrich discloses a locking system for preventing a take-up reel of a tape drive from rotating when a tape cartridge is not inserted to the drive.

On the other hand, an example of the tape cartridge installed in the digital linear tape drive is disclosed in Japanese Unexamined Patent Publication Tokkai No. 2000-149491 or JP-A 2000-149491.

In addition, U.S. Pat. No. 6,241,171, entitled: "Leaderless Tape Drive" to Gaboury discloses a tape drive wherein a tape leader from a tape cartridge is urged through a tape path, into a take-up reel, and secured therein without the use of a bucking mechanism or a take-up leader.

In addition, the tape drive further comprises a tape head actuator assembly which is located between a take-up spool and a tape cartridge on a tape path defined by a plurality of rollers. During operation, a magnetic tape flows forward and backward between the take-up spool and the tape cartridge and is closely adjacent to the tape head actuator assembly while the magnetic tape flows on the defined tape path. An example of such as a tape head actuator assembly is disclosed in the above-mentioned U.S. Pat. No. 5,793,574.

Now, as is disclosed in the above-mentioned JP-A 2000-149491, the tape cartridge comprises a case and a rotary reel (a supply reel) which is rotatably stored in the case and which winds a recording/reproducing magnetic tape therearound. In such as a tape cartridge, it is necessary to stop rotational driving of the supply reel in a state where the tape cartridge is not inserted in the slot of the tape drive. Otherwise, there is fear of inconvenience occurring such that the magnetic tape breaks out of the tape cartridge to the exterior caused by rotation of the supply reel in the tape cartridge when the tape cartridge is carried or the like. For this purpose, the tape cartridge contains a reel hub lock mechanism for locking a reel hub of the supply reel. Such as a lock in the reel hub of the supply reel is called a "reel hub lock" in the art. That is, the tape cartridge is put into a state where the reel hub of the supply reel is made in the reel hub lock by the reel hub lock mechanism when it is not inserted in the slot of the tape drive. The reel hub lock mechanism includes a lock lever for enabling to release the reel hub lock by operating the lock lever from the exterior.

On the other hand, the tape drive requires a mechanism for releasing the reel hub lock by operating the above-mentioned lock lever when or after the tape cartridge is inserted in the slot. Such as a mechanism is called a "reel hub lock releasing mechanism." More specifically, the tape drive comprises a loading mechanism for engaging the supply reel with the supply reel motor after the tape cartridge is inserted in the slot. The loading mechanism comprises a loading motor mounted on the chassis and a ring cam driven by the loading motor. The ring cam is coaxial with a rotation axis of the supply reel motor and is rotatably disposed between a back surface of the chassis and the supply reel motor. The ring cam has a cam groove. The reel hub lock releasing mechanism comprises a release lever having an engaging projection for engaging with the cam groove of the ring cam. When the tape cartridge is inserted in the slot, the reel hub lock releasing mechanism releases, in response to rotation of the ring cam, the reel hub lock by operating the lock lever.

In the manner which will later be described in conjunction with FIGS. 1 through 5, in a conventional reel hub lock releasing mechanism, a load is always applied to the ring cam by a spring. Accordingly, the loading motor for driving the ring cam must operate in opposition of this load. Therefore, a larger one is required as the loading motor and a life of the loading motor becomes shorter. In addition, inasmuch as a friction force based on the engaging projection of the release lever is exerted on the cam groove of the ring cam caused by the spring. Furthermore, inasmuch as the release lever consisting the reel hub lock releasing mechanism itself has long and large size which extends from a front side of the tape drive to a center rear side thereof, it is difficult to miniaturize the reel hub lock releasing mechanism. In addition, inasmuch as the reel hub lock releasing mechanism is composed of a lot of parts such as the release lever, a fulcrum shaft, and the spring, it is difficult to decrease the number of the parts and assembling thereof is complicated. As a result, it is really difficult to reduce costs of the reel hub lock releasing mechanism.

SUMMARY OF THE INVENTION

It is therefore an object of the present invention to provide a reel hub lock releasing mechanism which is capable of minimizing a loading motor and of lengthening the life of the loading motor.

It is another object of the present invention to provide a reel hub lock releasing mechanism of the type described, which is capable of decreasing friction to a ring cam.

It is still another object of the present invention to provide a reel hub lock releasing mechanism of the type described, which is capable of simplifying assembling of the reel hub lock releasing mechanism by decreasing the number of parts.

On describing the gist of an aspect of this invention, it is possible to be understood that a reel hub lock releasing mechanism is for use in a tape drive. The tape drive comprises a chassis having a main surface and a back surface, a take-up reel rotatably mounted on the main surface of the chassis, a take-up reel motor mounted on the back surface of the chassis for rotatably driving the take-up reel, a slot disposed on the main surface of the chassis for inserting a tape cartridge containing a supply reel, a supply reel motor mounted on the back surface of the chassis at a position opposed to the slot for rotatably driving the supply reel in the tape cartridge, and a loading mechanism for engaging the supply reel with the supply reel motor after the tape cartridge is inserted in the slot. The loading mechanism includes a loading motor disposed on the chassis and a ring cam operatively driven by the loading motor. The ring cam is coaxial with a rotation axis of the supply reel motor. The ring cam is rotatably disposed between the back surface of the chassis and the supply reel motor. The ring cam has a cam groove. The tape cartridge is put into a reel hub locked state where a reel hub of the supply reel is locked by a reel hub lock mechanism to stop rotation of the supply reel when the tape cartridge is not inserted in the slot. The reel hub lock mechanism includes a lock lever for enabling to release a reel hub lock by operating the lock lever from the exterior. The reel hub lock releasing mechanism is for releasing the reel hub lock by operating the lock lever in response to rotation of the ring cam when the tape cartridge is inserted in the slot. According to the aspect of this invention, the reel hub lock releasing mechanism comprises a seesaw-type release lever rotatably disposed on the back surface of the chassis around a fulcrum part at a center thereof. The seesaw-type release lever comprises first and second plate bodies extending from the fulcrum part toward both sides. The first plate body has, at a tip thereof, an engaging projection engaged with the cam groove of the ring cam. The second plate body has, at a tip thereof, a lever operating projection which projects upward to operate the lock lever. The reel hub lock releasing mechanism further may comprise a spring, disposed around the fulcrum part, for preventing a part from falling away to fit the seesaw-type release lever to the chassis.

DESCRIPTION OF THE PREFERRED EMBODIMENT

Figure 1:
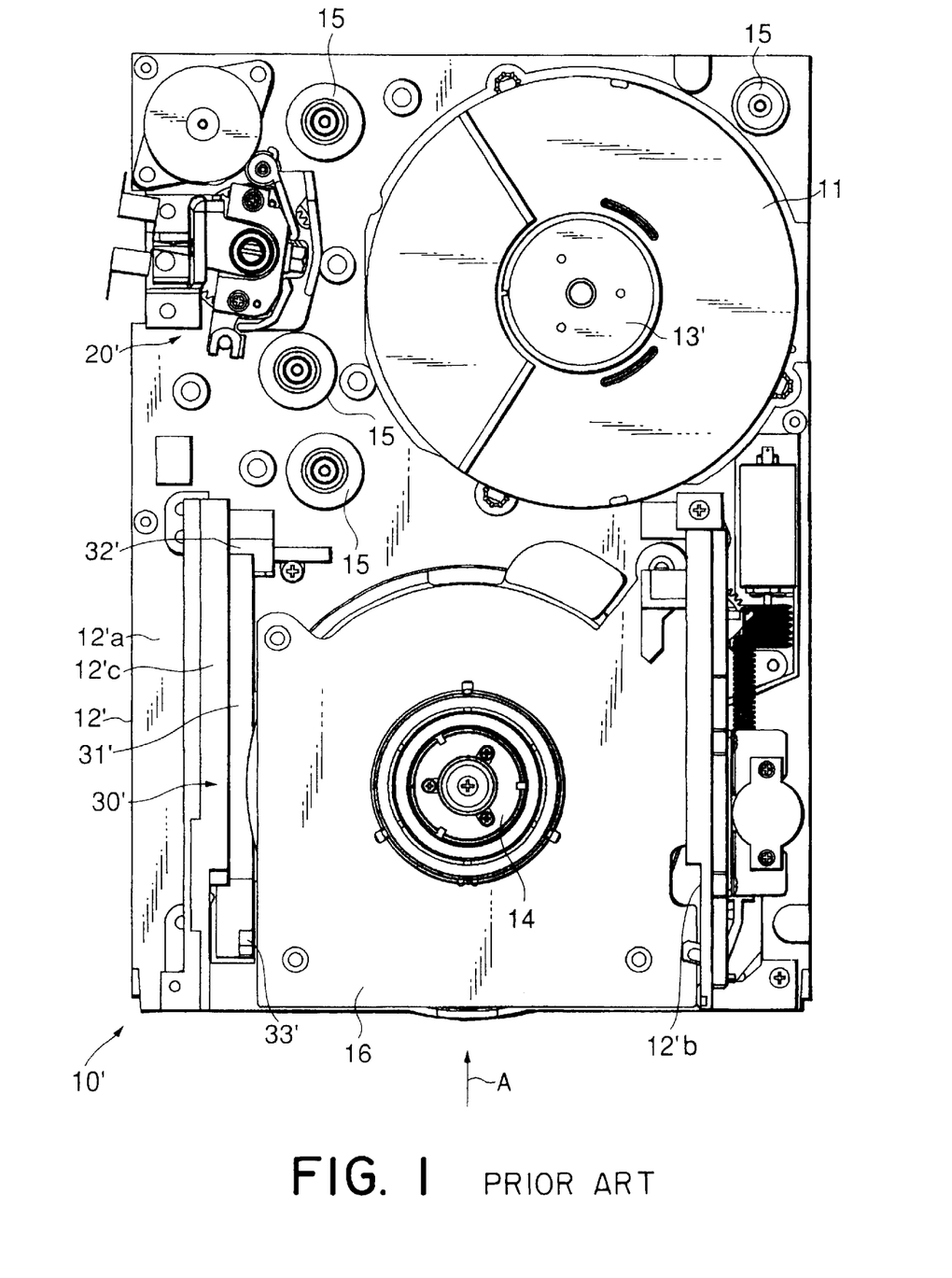
FIG. 1 is a plan view showing a conventional tape drive including a conventional reel hub lock releasing mechanism with an upper cover removed therefrom.

Referring to FIG. 1, a conventional tape drive including a conventional reel hub lock releasing mechanism will be described at first in order to facilitate an understanding of the present invention. FIG. 1 is a plan view showing the conventional tape drive with an upper cover is removed therefrom.

The tape drive depicted at 10' is for receiving a tape cartridge (not shown) and contains a take-up reel 11 inside thereof. The take-up reel 11 is also called a spool. The tape drive 10' is generally comprised of a rectangular housing (chassis) 12' that has a common base 12'a. The base 12'a has two spindle motors (reel motors) 13' and 14. The first spindle motor 13' has the spool (or the take-up reel) 11 permanently mounted on the base 12'a and the spool 11 is dimensioned to accept a relatively high speed streaming magnetic tape (not shown). The second spindle motor (reel motor) 14 is adapted to accept the removable tape cartridge. The removable tape cartridge is manually or automatically inserted into the tape drive 10' via a slot 12'b formed on the housing 12' of the tape drive 10' along an insertion direction depicted at an arrow A. The first spindle motor 13' is called a take-up reel while the second spindle motor 14 is called a supply reel motor.

Upon insertion of the tape cartridge into the slot 12'b of the tape drive 10', the cartridge engages the second spindle motor (the supply reel motor) 14 by means of a loading mechanism which will later be described. Prior to rotation of the first and the second spindle motors (reel motors) 13' and 14, the tape cartridge is connected to the permanently mounted spool (the take-up reel) 11 by means of a mechanical buckling mechanism (not shown). A number of rollers (guide rollers) 15 positioned intermediate the tape cartridge and the permanent spool guide the magnetic tape as it traverses at relatively high speeds back and forth between the tape cartridge and the permanently mounted spool 11.

In addition, inasmuch as the housing (the chassis) 12' is made, by die-casting, of aluminum which is non-magnetic material, the second spindle motor 14 is cover with a plate 16 made of ionic magnetic material in order to shield magnetic leakage from a magnet (not shown) of the second spindle motor 14. The plate 16 is called a floor receiver.

The tape drive 10' further comprises a magnetic tape head actuator assembly (which will later be merely called a "actuator assembly") 20'. The actuator assembly 20' is located between the take-up spool 11 and the tape cartridge on a tape path (not shown) defined by the above-mentioned plurality of rollers 15. During operation, a magnetic tape flows forward and backward between the take-up spool 11 and the tape cartridge and is closely adjacent to the actuator assembly 20' while the magnetic tape flows on the defined tape path.

A conventional reel hub lock releasing mechanism 30' is disposed closely to a left-hand wall surface (a left receiver) 12'c of the tape drive 10', as shown in FIG. 1.

In addition, although illustration is not made, the tape cartridge contains a reel hub lock mechanism in the manner which is described above. The reel hub lock mechanism is a mechanism for locking a reel hub of the supply reel (carrying out a reel hub lock). The reel hub lock mechanism includes a lock lever for enabling to release the reel hub lock by operating the lock lever from the exterior. The lock lever is disposed in the tape cartridge closely at a left-hand and rear corner thereof and is arranged at a position which is seen from the exterior through an opening bored in a lower surface of a case of the tape cartridge.

Figure 2:
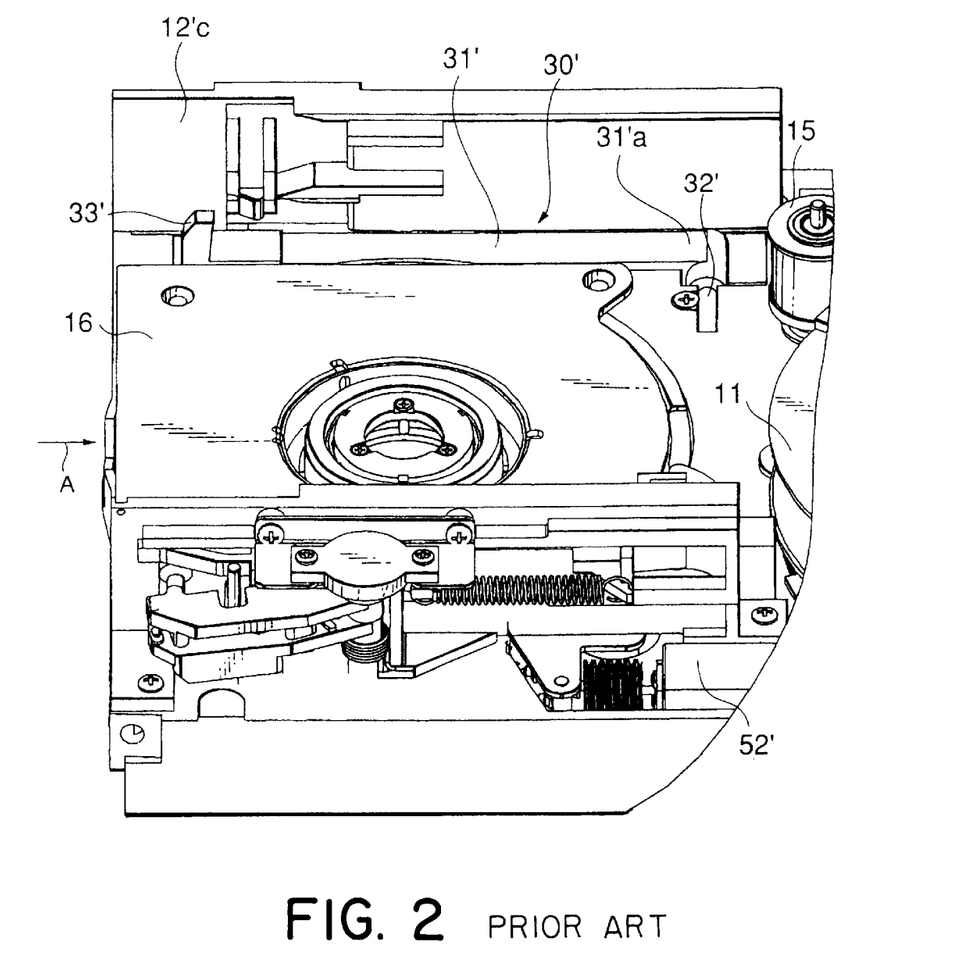
FIG. 2 is a perspective view, obliquely seen from a main surface side, showing a main portion of the conventional tape drive including the conventional reel hub lock releasing mechanism.
Figure 3:
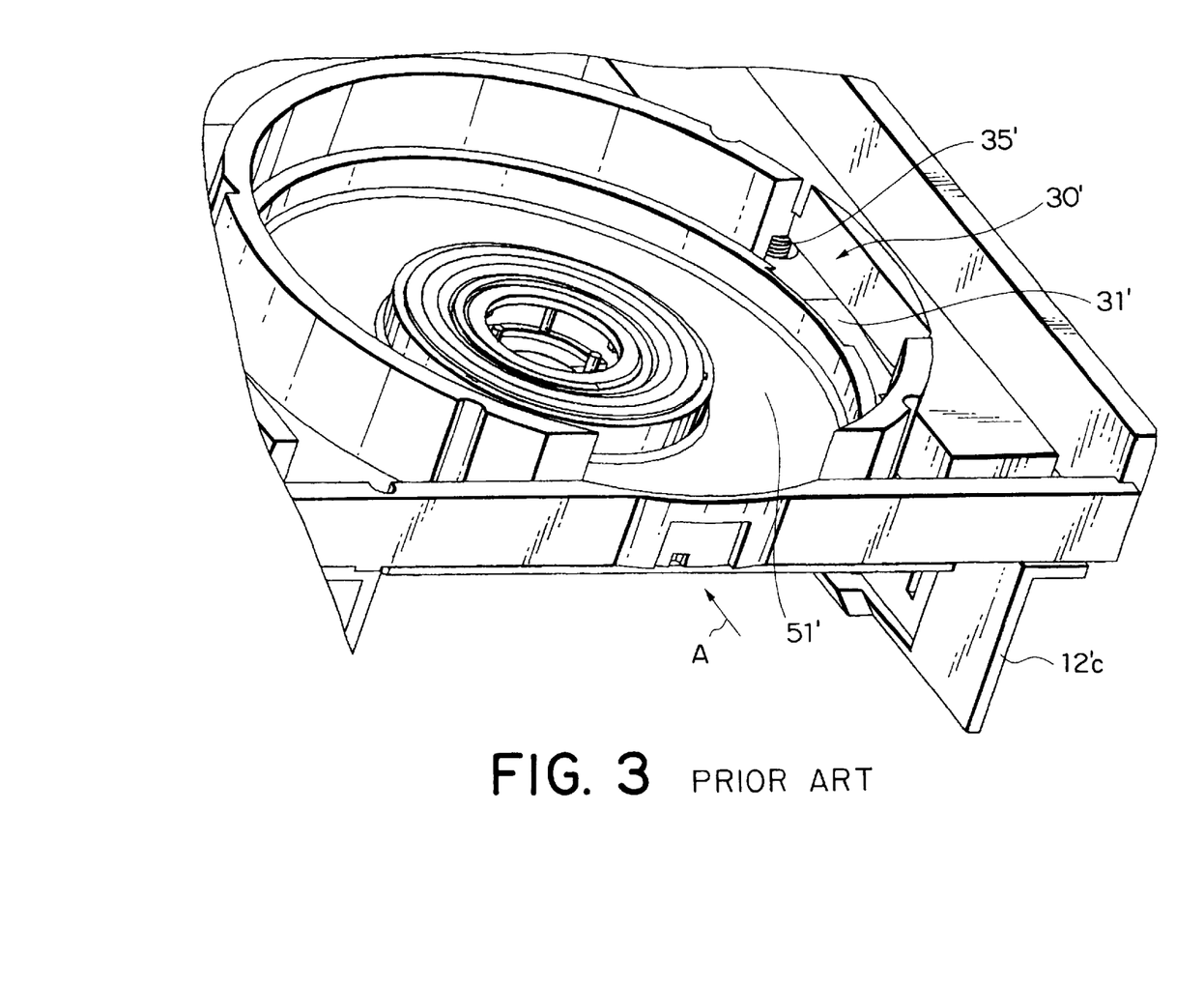
FIG. 3 is a perspective view, obliquely seen from a back surface side, showing the main portion of the conventional tape drive including the conventional reel hub lock releasing mechanism.
Figure 4:
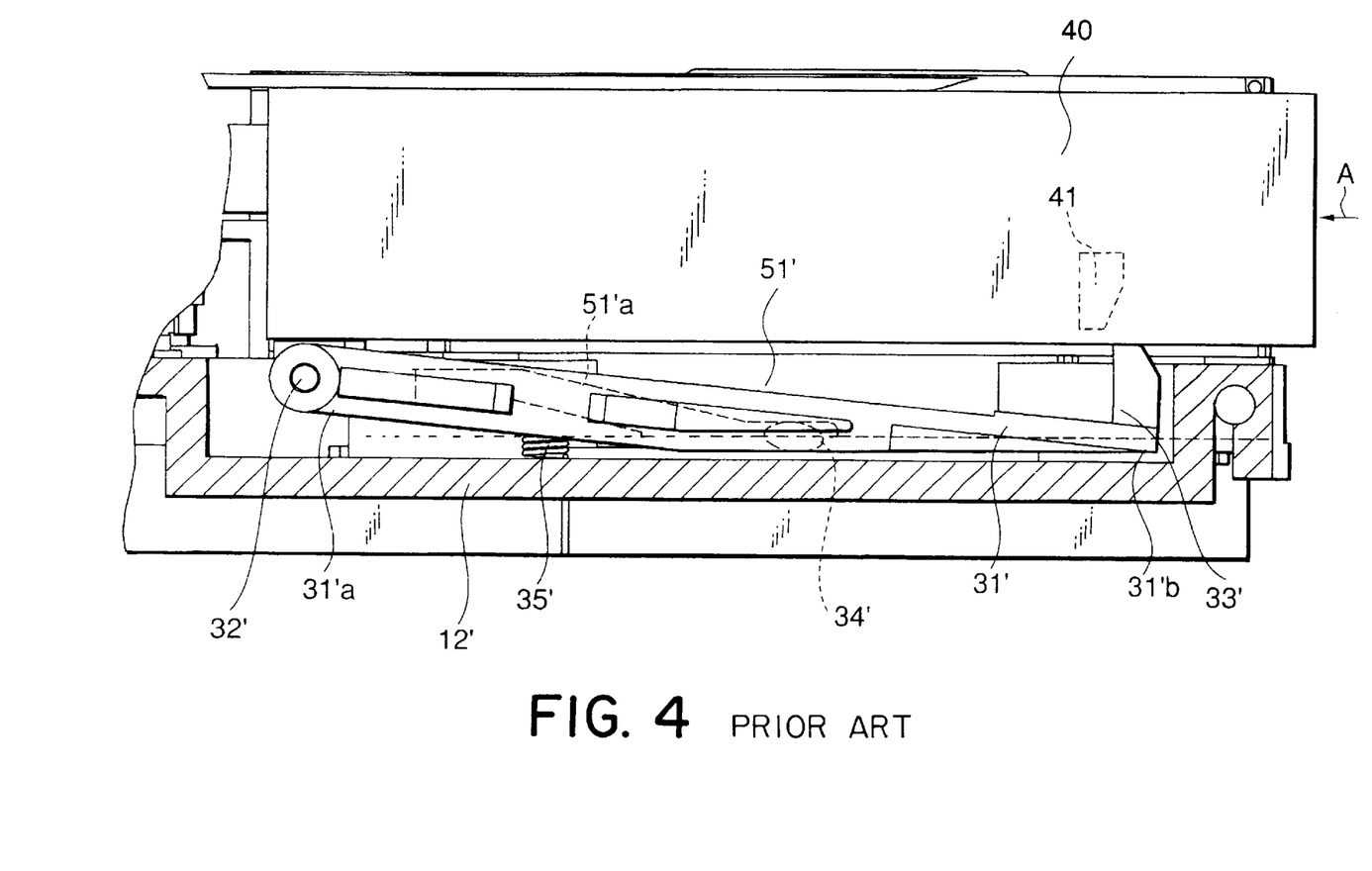
FIG. 4 is a cross sectional view showing a state of the conventional reel hub lock releasing mechanism in a case where a reel hub lock mechanism is put into a reel hub locked state.
Figure 5:
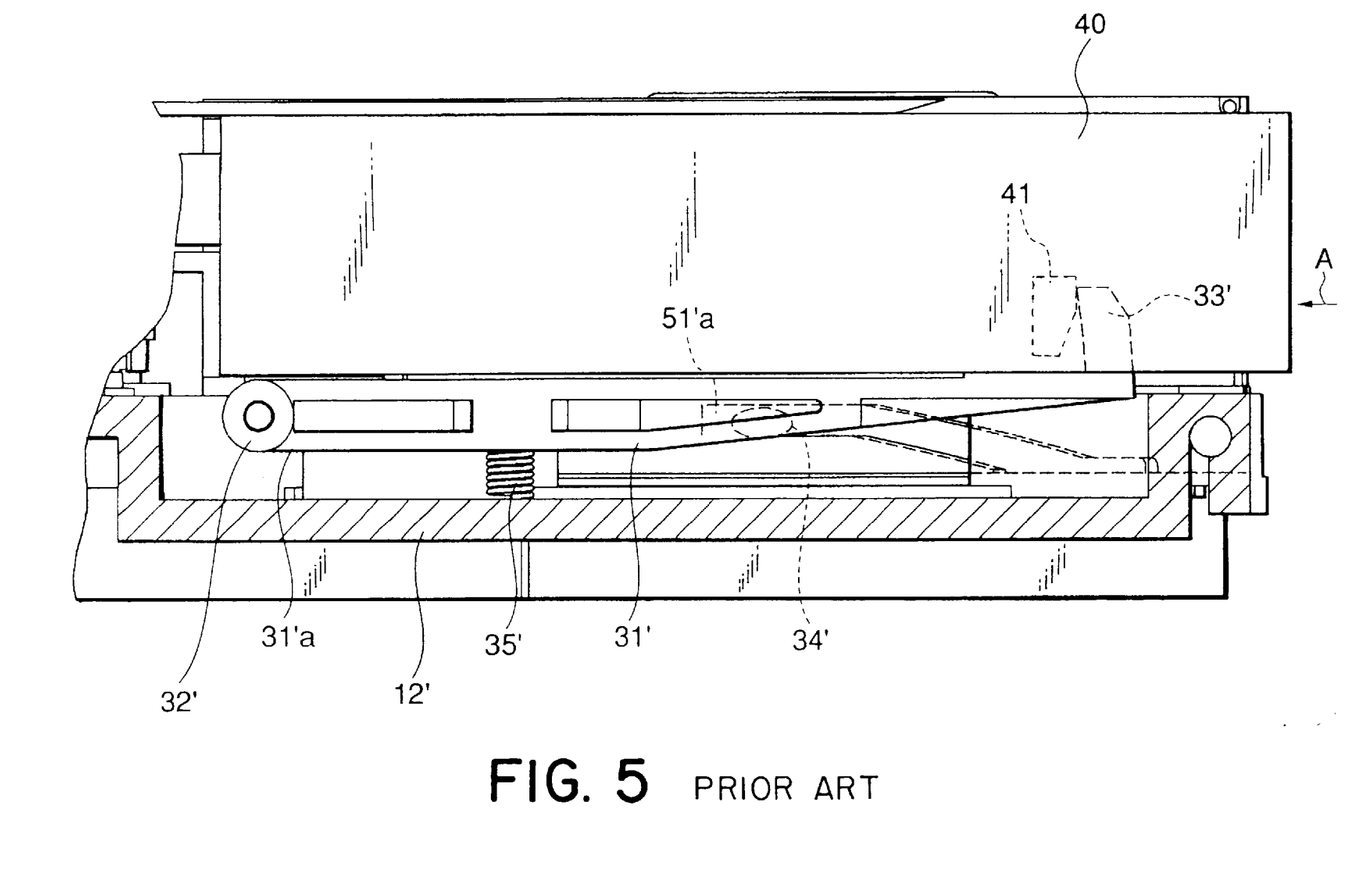
FIG. 5 is a cross sectional view showing another state of the conventional reel hub lock releasing mechanism in a case where the real hub lock mechanism is put into a reel hub lock released state.

Referring now to FIGS. 2 through 5, the description will proceed to a conventional reel hub lock releasing mechanism 30'. FIG. 2 is a perspective view, obliquely seen from a main surface side, showing a main portion of the conventional tape drive 10' including the conventional reel hub lock releasing mechanism 30'. FIG. 3 is a perspective view, obliquely seen from a back surface side, showing the main portion of the conventional tape drive 10' including the conventional reel hub lock releasing mechanism 30'. In addition, FIG. 4 is a cross sectional view showing a state of the conventional reel hub lock releasing mechanism 30' in a case where the reel hub lock mechanism is put into a reel hub locked state. FIG. 5 is a cross sectional view showing another state of the conventional reel hub lock releasing mechanism 30' in a case where the real hub lock mechanism is put into a reel hub lock released state.

The reel hub lock releasing mechanism 30' comprises a release lever 31' which is disposed on the main surface of the chassis 12' and which extends in parallel with the left receiver 12'c in the insertion direction A. The release lever 31' has a rear side end 31'a coupled to a fulcrum shaft 32' which is rotatably mounted in the chassis 12'. On the other hand, as shown in FIG. 4, the release lever 31' has a front side end 31'b coupled to a lever operating projection 33' which projects upward to operate the lock lever depicted at 41 of the tape cartridge depicted at 40, in the manner which is described above. In addition, the release lever 31' has, at about a center thereof, an engaging projection 34' engaged with a cam groove 51'a of a ring cam 51' in the loading mechanism which will later be described.

The release lever 31' is always pushed or urged upward by a spring 35' disposed between the release lever 31' and the main surface of the chassis 12'. In other words, the release lever 31' is always pushed upward by the spring 35' having a spring-load which is necessary and sufficient to release the reel hub lock. In the manner which is described above, inasmuch as the engaging projection 34' of the release lever 31' engages with the cam groove 51'a of the ring cam 51', the spring 35' with the spring-load pushes the ring cam 51' upward at the cam groove 51'a so as to keep a deformation of the ring cam 51' for driving the release lever 31' to a minimum. Inasmuch as driving of the release lever 31' is carried out at the periphery of the ring cam 51, a heavy load always applies to the ring cam 51'.

In addition, the loading mechanism comprises a loading motor 51' disposed on the chassis 12' and the ring cam 51' is operatively driven by the loading motor 52'.

Referring now to FIGS. 4 and 5, description will be made as regards operation of the conventional reel hub lock releasing mechanism 30'.

As shown in FIG. 4, in a case where the reel hub lock mechanism is put into the reel hub locked state, the engaging projection 34' of the release lever 31' is positioned at a lower groove in the cam groove 51'a of the ring cam 51' and the lever operating projection 33' is positioned downward. Under the circumstances, a pushing force is exerted on the cam groove 51'a of the ring cam 51' upward caused by the spring 35'. In other words, the above-mentioned pushing force is always exerted on the ring cam 51' in the state where the tape cartridge 40 is not inserted in the slot 12'b of the tape drive 10'.

In addition, FIG. 4 illustrates a state immediately after the tape cartridge 40 is inserted in the slot 12'b of the tape drive 10' and illustrates a state where the loading mechanism is not operated yet. In this state, as shown in FIG. 4, the tape drive 10' is put into a state where the lever operating projection 33' of the release lever 31' and the lock lever 41 of the tape cartridge 40 are separated from each other.

After the tape cartridge 40 is inserted in the slot 12'b of the tape drive 10', the loading mechanism is operated in order to engage the supply reel (not shown) with the supply reel motor (FIG. 1). That is, the loading motor 52' (FIG. 2) operates to rotatably drive the ring cam 51' in a counter-clockwise direction. As a result, the engaging projection 34' of the release lever 31' moves along the cam groove 51'a of the ring cam 51' upward due to an urging force of the spring 35' from the lower groove to an upper groove. Accordingly, the lever operating projection 33' of the release lever 31' also rotates around the fulcrum shaft 32' upward and then, as shown in FIG. 5, the lever operating projection 33' is engaged with the lock lever 41. Thus, the reel hub lock of the tape cartridge 40 is released. As a result, it is possible to pull, from the supply reel of the tape cartridge 40, the magnetic tape wound therearound to the exterior.

In the manner which is described above, in the conventional reel hub lock releasing mechanism 30', a load is always applied to the ring cam 51' caused by the spring 35'. Accordingly, the loading motor 52' for driving the ring cam 51' must operate in opposition of this load. Therefore, a larger one is required as the loading motor 51' and a life of the loading motor 51' becomes shorter. In addition, inasmuch as a friction force based on the engaging projection 34' of the release lever 31' is exerted on the cam groove 51'a of the ring cam 51' caused by the spring 35'. Furthermore, inasmuch as the release lever 31' constituting the reel hub lock releasing mechanism 30' itself has long and large size which extends from a front side of the tape drive 10' to a center rear side thereof, it is difficult to miniaturize the reel hub lock releasing mechanism 30'. In addition, inasmuch as the reel hub lock releasing mechanism 30' is composed of a lot of parts such as the release lever 31', the fulcrum shaft 32', and the spring 35', it is difficult to decrease the number of the parts and assembling thereof is complicated. As a result, it is really difficult to reduce costs of the reel hub lock releasing mechanism, as mentioned in the preamble of the instant specification.

Figure 6:
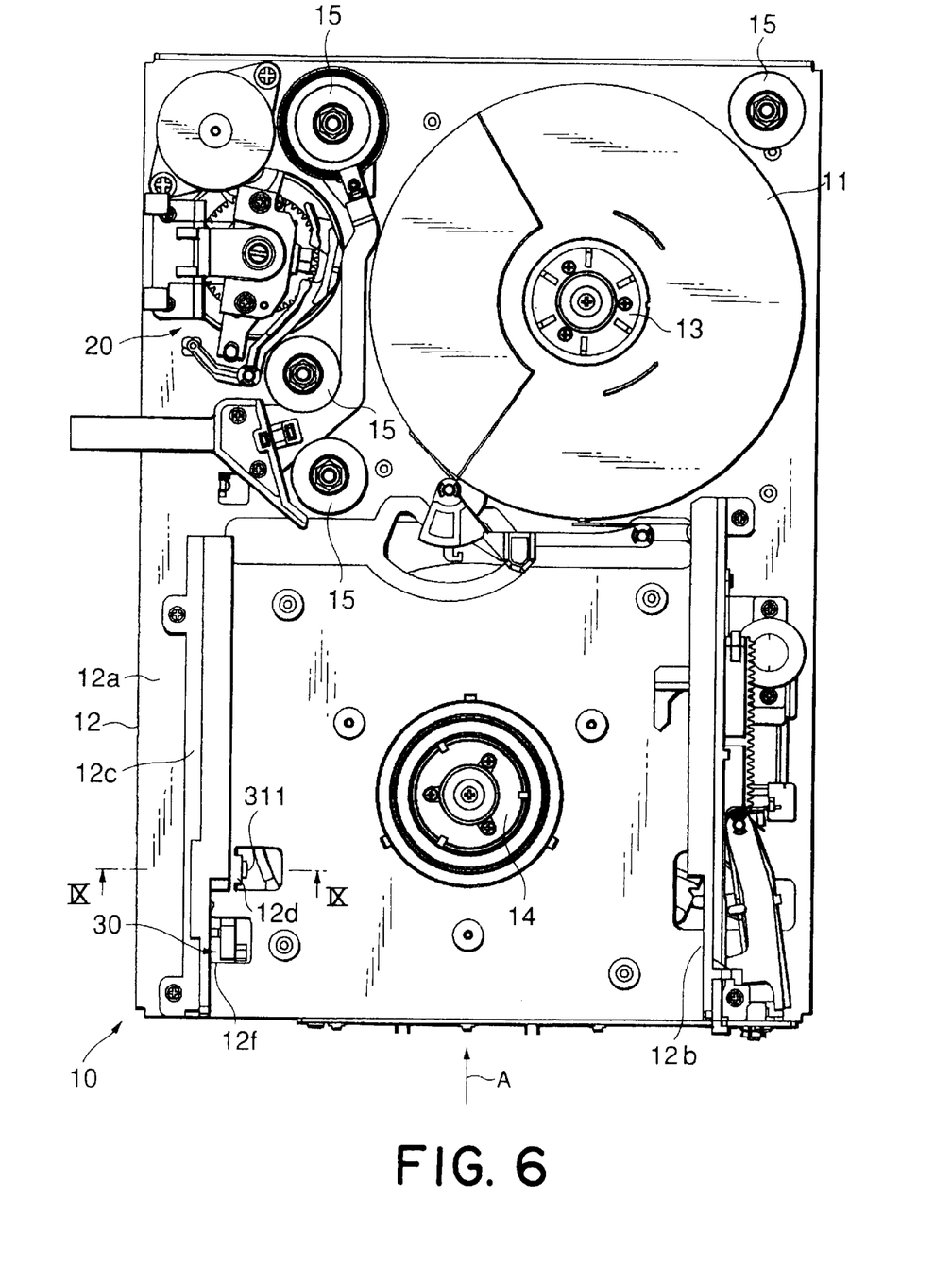
FIG. 6 is a plan view showing a tape drive including a reel hub lock releasing mechanism according to an embodiment of this invention with an upper cover removed therefrom.

Referring now to FIG. 6, the description will proceed to a tape drive including a reel hub lock releasing mechanism according to this invention. FIG. 6 is a plan view showing the tape drive with an upper cover removed therefrom.

The tape drive depicted at 10 is for receiving a tape cartridge (not shown) and contains a take-up reel 11 inside thereof. The take-up reel 11 is also called a spool. The tape drive 10 is generally comprised of a rectangular housing (chassis) 12 that has a common base 12a. The base 12a has first and second spindle motors (reel motors) 13 and 14. The first spindle motor 13 has the spool (or the take-up reel) 11 permanently mounted on the base 12a and the spool 11 is dimensioned to accept a relatively high speed streaming magnetic tape (not shown). The second spindle motor (reel motor) 14 is adapted to accept the removable tape cartridge. The removable tape cartridge is manually or automatically inserted into the tape drive 10 via a slot 12b formed on the housing 12 of the tape drive 10 along an insertion direction depicted at an arrow A. The first spindle motor 13 is called a take-up reel motor while the second spindle motor 14 is called a supply reel motor.

Upon insertion of the tape cartridge into the slot 12b, the tape cartridge engages the second spindle motor (the supply reel motor) 14 by means of a loading mechanism which will later be described. Prior to rotation of the first and the second spindle motors (reel motors) 13 and 14, the tape cartridge is connected to the permanently mounted spool (the take-up reel) 11 by means of a mechanical buckling mechanism (not shown). A number of rollers (guide rollers) 15 positioned intermediate the tape cartridge and the permanent spool 11 guide the magnetic tape as it traverses at relatively high speeds back and forth between the tape cartridge and the permanently mounted spool 11. In addition, the housing 12 comprises a plate made of an irony magnetic material which press working is performed.

The tape drive 10 further comprises a magnetic tape head actuator assembly (which will later be merely called a "actuator assembly") 20. The actuator assembly 20 is located between the take-up spool 11 and the tape cartridge on a tape path (not shown) defined by the above-mentioned plurality of rollers 15. During operation, a magnetic tape flows forward and backward between the take-up spool 11 and the tape cartridge and is closely adjacent to the actuator assembly 20 while the magnetic tape flows on the defined tape path.

The reel hub lock releasing mechanism depicted at 30 according to this invention is disposed closely to a left-hand wall surface (a left receiver) 12c of the tape drive 10, as shown in FIG. 6.

In addition, although illustration is not made, the tape cartridge contains a reel hub lock mechanism in the manner which is described above. The reel hub lock mechanism is a mechanism for locking a reel hub of the supply reel (carrying out a reel hub lock). The reel hub lock mechanism includes a lock lever for enabling to release the reel hub lock by operating the lock lever from the exterior. The lock lever is disposed in the tape cartridge closely at a left-hand and rear corner thereof and is arranged at a position which is seen from the exterior through an opening bored in a lower surface of a case of the tape cartridge.

Figure 7:
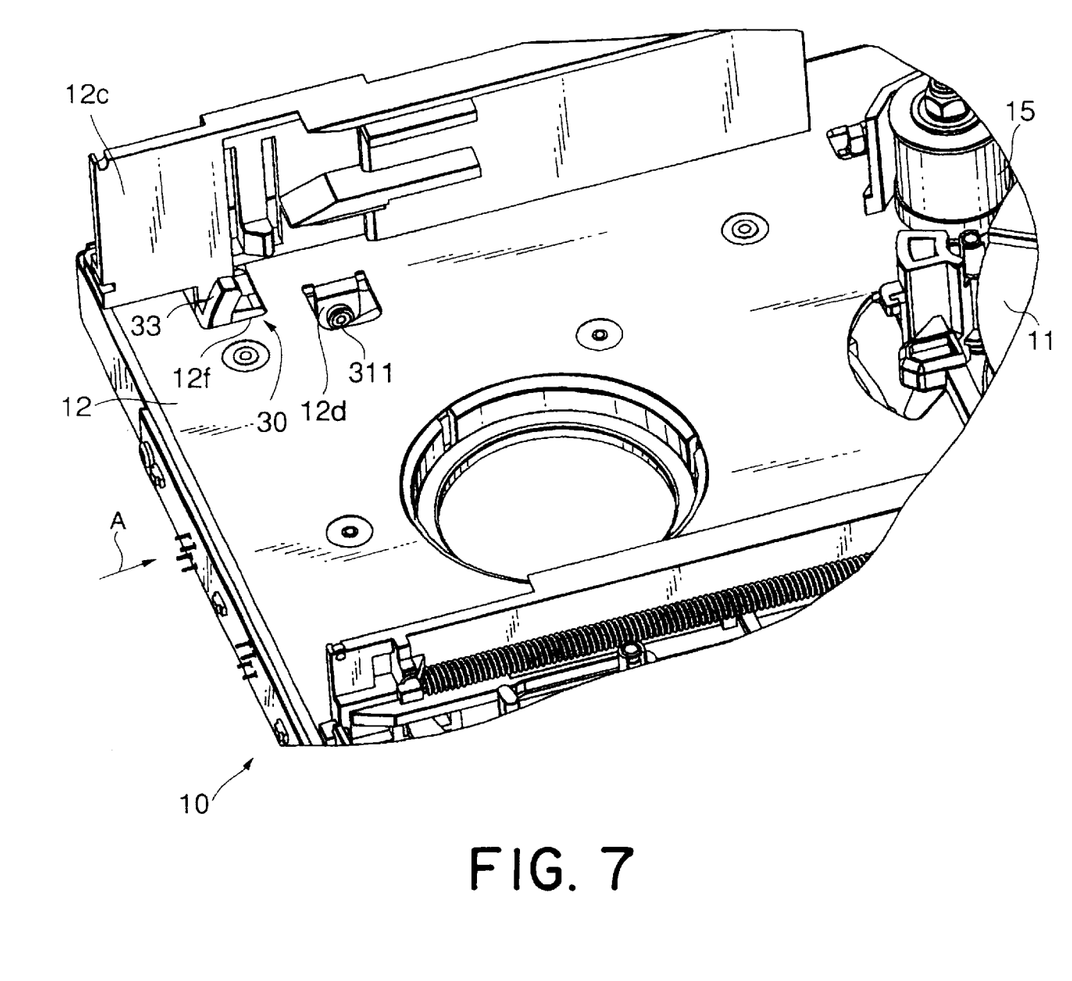
FIG. 7 is a perspective view, obliquely seen from a main surface side, showing a main portion of the tape drive including the reel hub lock releasing mechanism illustrated in FIG. 6.
Figure 8:
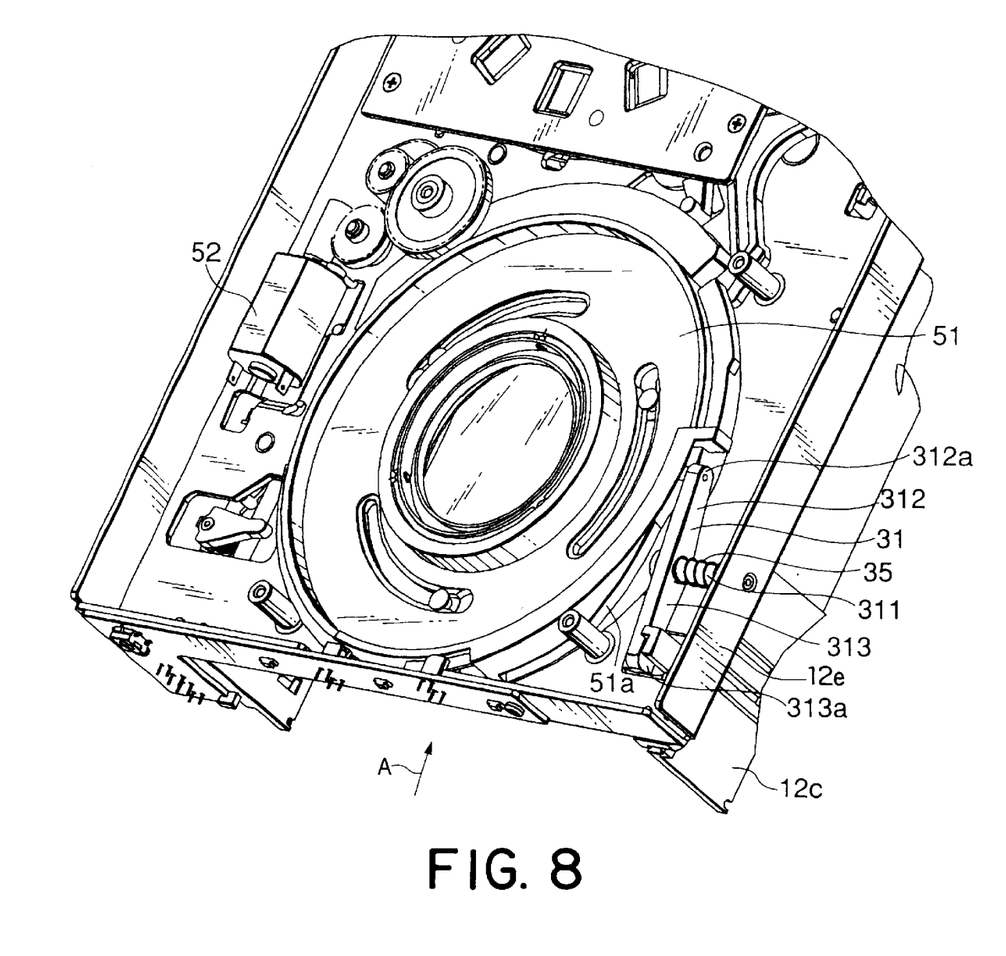
FIG. 8 is a perspective view, obliquely seen from a back surface side, showing the main portion of the tape drive including the reel hub lock releasing mechanism illustrated in FIG. 7.
Figure 9:
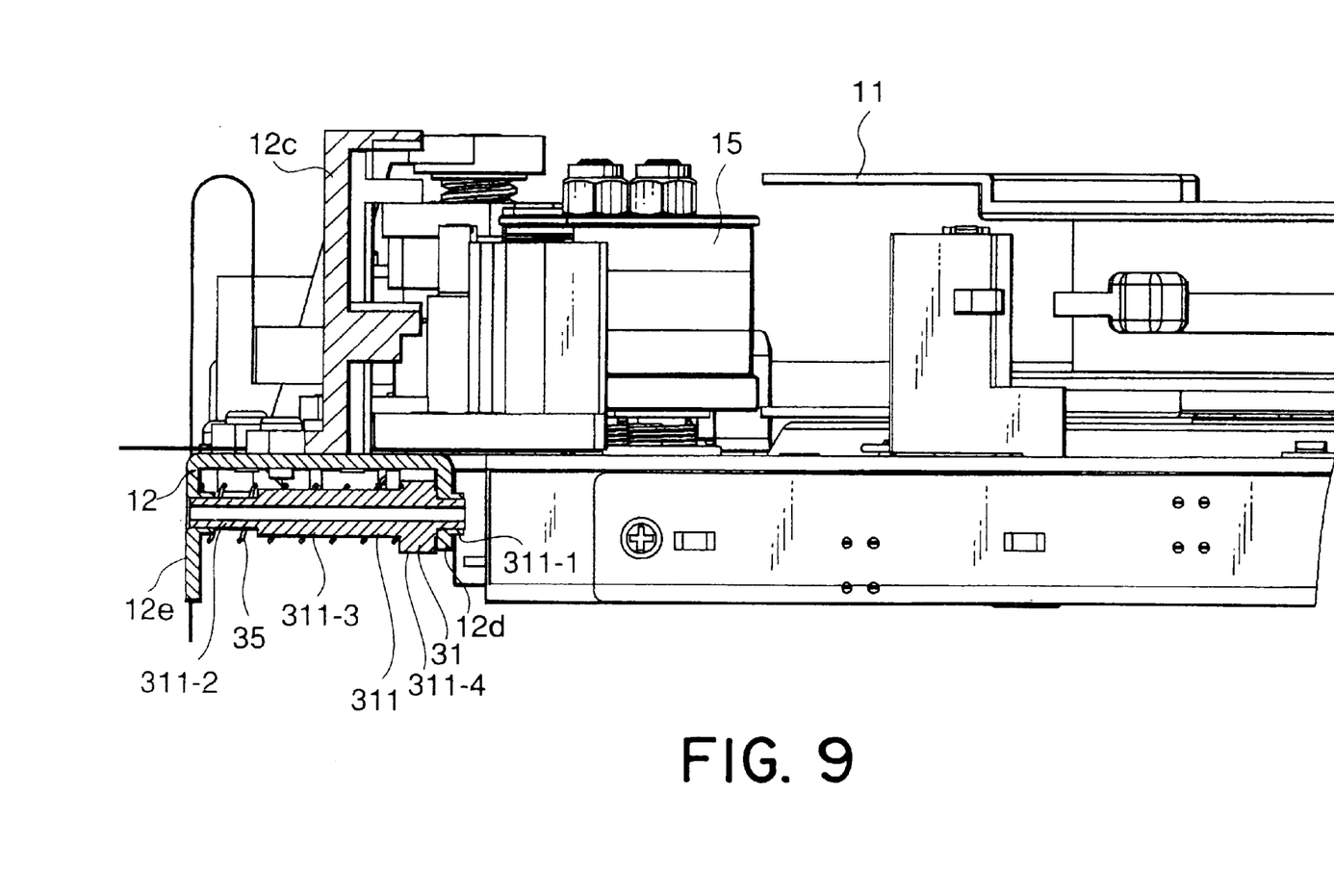
FIG. 9 is a cross sectional view taken on line IX—IX of FIG. 6.
Figure 10:
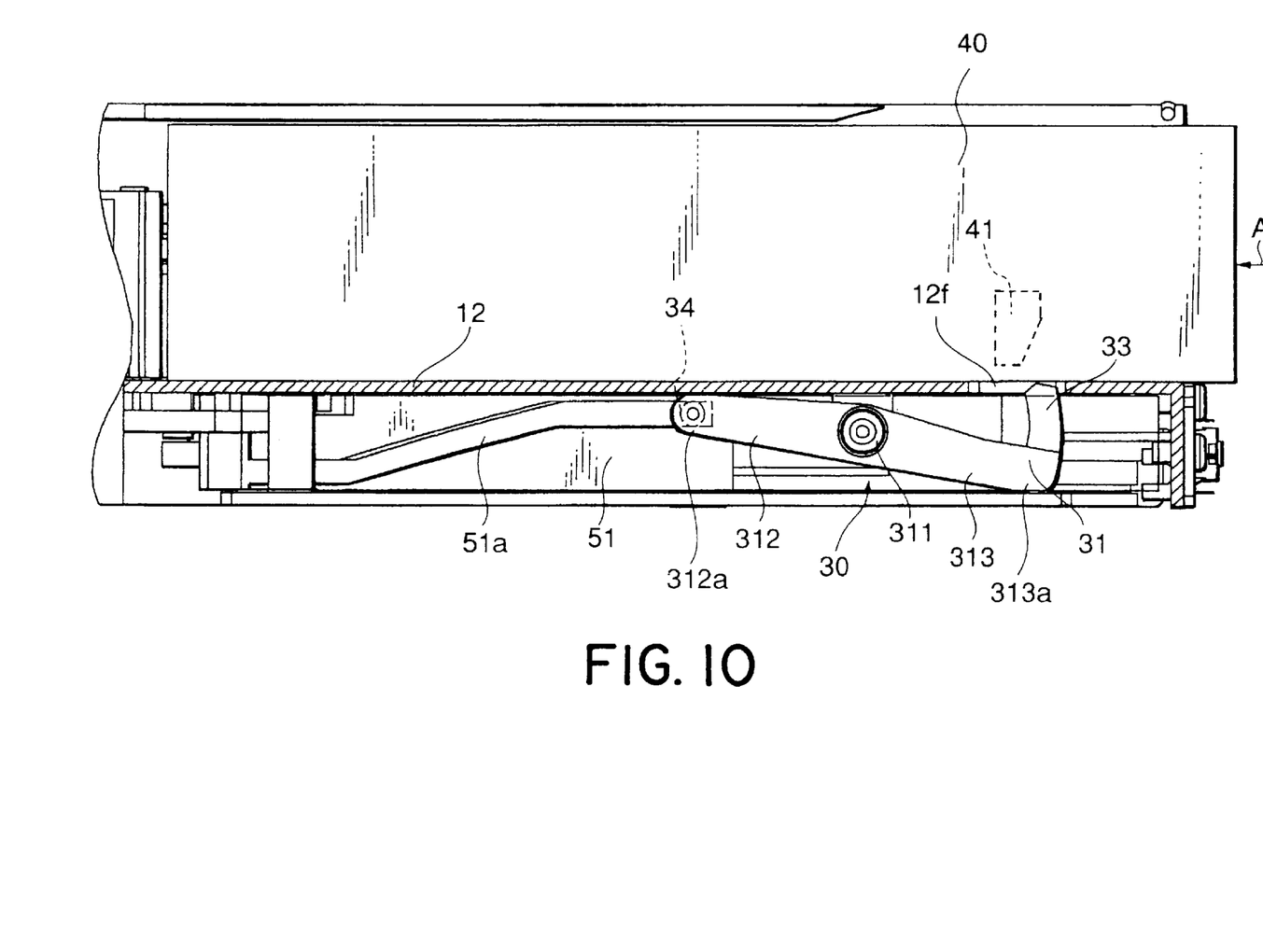
FIG. 10 a cross sectional view showing a state of the reel hub lock releasing mechanism illustrated in FIG. 7, in a case where a reel hub lock mechanism is put into a reel hub locked state.
Figure 11:
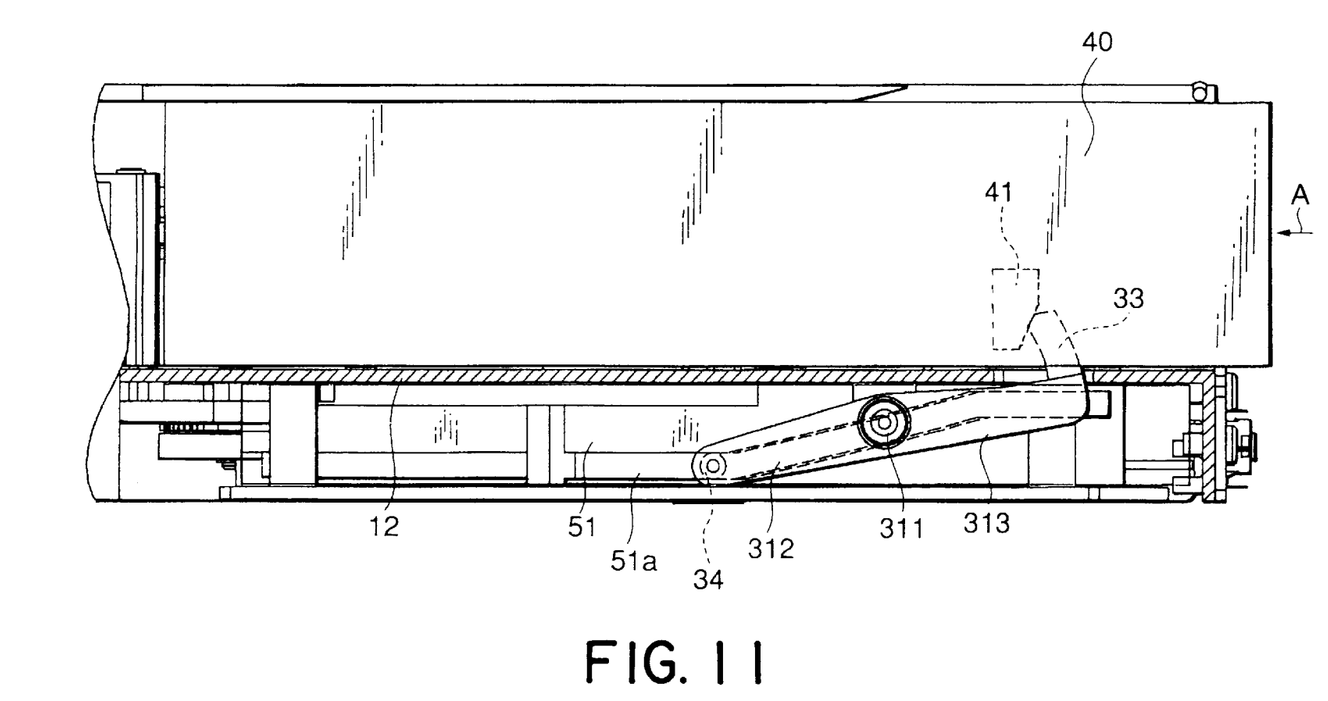
FIG. 11 is a cross sectional view showing another state of the reel hub lock releasing mechanism illustrated in FIG. 7, in a case where the real hub lock mechanism is put into a reel hub lock released state.

Referring now to FIGS. 7 through 11, the description will proceed to the reel hub lock releasing mechanism depicted at 30 according to an embodiment of this invention. FIG. 7 is a perspective view, obliquely seen from a main surface side, showing a main portion of the tape drive 10 including the reel hub lock releasing mechanism 30. FIG. 8 is a perspective view, obliquely seen from a back surface side, showing the main portion of the tape drive 10 including the reel hub lock releasing mechanism 30. FIG. 9 is a cross sectional view taken on line IX—IX of FIG. 6. In addition, FIG. 10 a cross sectional view showing a state of the reel hub lock releasing mechanism 30 in a case where the reel hub lock mechanism is put into a reel hub locked state. FIG. 11 is a cross sectional view showing another state of the reel hub lock releasing mechanism 30 in a case where the real hub lock mechanism is put into a reel hub lock released state.

The illustrated reel hub lock releasing mechanism 30 comprises a release lever 31 which is disposed on a back surface of the chassis 12 and which extends in parallel with the left receiver 12c in the insertion direction A. The release lever 31 is rotatably disposed on the chassis 12 around a center thereof as a fulcrum part 311 and has a seesaw type comprising first and second plate bodies 312 and 313 which extend from the fulcrum part 311 to both sides. The fulcrum part 311 substantially has a cylindrical shape.

More specifically, the chassis 12 has, as shown in FIG. 7, a tongue piece 12d perpendicularly bent downward in the vicinity of the left receiver 12c inside. In addition, the fulcrum part 311 of the release lever 31 is rotatably disposed between the tongue piece 12d and a left-hand side surface 12e perpendicularly bent downward at a left-hand side edge of the chassis 12. The fulcrum part 311 extends in a direction perpendicular to the insertion direction A. Disposed around the fulcrum part 311, a spring 35 urges the fulcrum part 311 toward the tongue piece 12d. The spring 35 is for preventing a part from falling away to improve assembling of the reel hub lock releasing mechanism 30.

As shown in FIG. 9, the fulcrum part 311 of the release lever 31 comprises a first insertion cylindrical part 311-1 inserted in a hole bored in the tongue piece 12d, a second insertion cylindrical part 311-2 which is inserted in a hole bored in the left-hand side surface 12e and which is longer than that of the first insertion cylindrical part 311-1, a middle cylindrical part 311-3 extending from the second insertion cylindrical part 311-2 toward the tongue piece 12d, and an engaging cylindrical part 311-4 extending between the middle cylindrical part 311-3 and the first insertion cylindrical part 311-1. These cylindrical parts 311-1 to 311-4 have external diameters as follows. The first insertion cylindrical part 311-1 has an external diameter which is equal to that of the second insertion cylindrical part 311-2. The middle cylindrical part 311-3 has an external diameter which is larger than that of the second insertion cylindrical part 311-2. The engaging cylindrical part 311-4 has an external diameter which is larger than that of the middle cylindrical part 311-3. In addition, the spring 35 has a diameter between the external diameter of the middle cylindrical part 31-3 and the external diameter of the engaging cylindrical part 311-4. Accordingly, as shown in FIG. 9, the spring 35 is disposed between the engaging cylindrical part 311-4 and the left-hand side surface 12e to always urge the fulcrum part 311 toward the tongue piece 12d. As a result, it is possible to prevent the release lever 31 from falling away from the chassis 12.

As shown in FIG. 8, the first plate body 312 extends from the fulcrum part 311 along the insertion direction A toward a rear side of the tape drive 10 while the second plate body 313 extends from the fulcrum part 311 along the insertion direction A toward a front side of the tape drive 10. The first plate body 312 has, at a tip 312a thereof, an engaging projection 34 engaged with a cam groove 51a of a ring cam 51. On the other hand, the second plate body 313 has, at a tip 313a thereof, a lever operating projection 33 which projects upward to operate the lock lever depicted at 41 in the tape cartridge depicted at 40. The lever operating projection 33 enables to project the main surface side of the chassis 12 via an opening 12f bored in the chassis 12, as shown in FIG. 7.

In addition, the loading mechanism comprises a loading motor 51 disposed on the chassis 12 at the back surface thereof and the ring cam 51 is operatively driven by the loading motor 52. The ring cam 51 is coaxial with a rotation axis of the supply reel motor 14 (FIG. 6) and is rotatably disposed between the back surface of the chassis 12 and the supply reel motor 14.

Referring now to FIGS. 10 and 11, description will be made as regards operation of the reel hub lock releasing mechanism 30.

As shown in FIG. 10, in a case where a reel hub lock mechanism (not shown) of the tape cartridge 40 is put into the reel hub locked state, the engaging projection 34 of the release lever 31 is positioned at an upper groove in the cam groove 51 a of the ring cam 51 and the lever operating projection 33 is positioned downward.

In addition, FIG. 10 illustrates a state immediately after the tape cartridge 40 is inserted in the slot 12b of the tape drive 10 and illustrates a state where the loading mechanism is not operated yet. In this state, as shown in FIG. 10, the tape drive 10 is put into a state where the lever operating projection 33 of the release lever 31 and the lock lever 41 of the tape cartridge 40 are separated from each other.

After the tape cartridge 40 is inserted in the slot 12b of the tape drive 10, the loading mechanism is operated in order to engage the supply reel (not shown) with the supply reel motor 14 (FIG. 6). That is, the loading motor 52 (FIG. 8) operates to rotatably drive the ring cam 51 in a counterclockwise direction. As a result, the engaging projection 34 of the release lever 31 moves along the cam groove 51a of the ring cam 51 downward from the upper groove to a lower groove. Accordingly, the lever operating projection 33 of the release lever 31 rotates around the fulcrum part 311 upward and then, as shown in FIG. 11, the lever operating projection 33 is engaged with the lock lever 41. Thus, the reel hub lock of the tape cartridge 40 is released. As a result, it is possible to pull, from the supply reel of the tape cartridge 40, the magnetic tape wound therearound to the exterior.

As described above, inasmuch as the reel hub lock releasing mechanism 30 according to the embodiment of this invention comprises the seesaw-type release lever 31, the spring 35', which is required in the conventional reel hub lock releasing mechanism 30', for urging the release lever 31' upward is unnecessary. Accordingly, engaged with the cam groove 51a of the ring cam 51, the engaging projection 34 of the release lever 31 does not apply a load to the ring cam 51. Inasmuch as it is possible to decrease the load to the ring cam 51 in the manner which is described above, it is possible to use a smaller one as the loading motor 52 for driving the ring cam 51 and to lengthen a life of the loading motor 52. In addition, inasmuch as a friction force hardly acts to the cam groove 51a of the ring cam 51 from the engaging projection 34 of the release lever 31, it is possible to decrease friction. Furthermore, inasmuch as the release lever 31 constituting the reel hub lock releasing mechanism 30 is the seesaw-type, has a short length and is small-sized, it is easy to miniaturize the reel hub lock releasing mechanism 30. In addition, inasmuch as the reel hub lock releasing mechanism 30 comprises the seesaw-type release lever 31, it is possible to decrease the number of parts and to simplify assembling of the reel hub lock releasing mechanism 30. As a result, it is possible to reduce costs in the reel hub lock releasing mechanism 30.

While this invention has thus far been described in conjunction with a preferred embodiment thereof, it is to be understood that modifications will be apparent to those skilled in the art without departing from the spirit of the invention. For example, although the fulcrum part 311 of the release lever 31 is provided with the spring 35 for preventing a part from falling away to improve assembling of the reel hub lock releasing mechanism 30 in the above-mentioned embodiment, the spring 35 may be omitted from the reel hub lock releasing mechanism 30.

What is claimed is:

1. A reel hub lock releasing mechanism for use in a tape drive, said tape drive comprising a chassis having a main surface and a back surface, a take-up reel rotatably mounted on the main surface of said chassis, a take-up reel motor mounted on the back surface of said chassis for rotatably driving said take-up reel, a slot disposed on the main surface of said chassis for inserting a tape cartridge containing a supply reel, a supply reel motor mounted on the back surface of said chassis at a position opposed to said slot for rotatably driving said supply reel in said tape cartridge, and a loading mechanism for engaging said supply reel with said supply reel motor after said tape cartridge is inserted in said slot, said loading mechanism including a loading motor disposed on said chassis and a ring cam operatively driven by said loading motor, said ring cam being coaxial with a rotation axis of said supply reel motor, said ring cam being rotatably disposed between the back surface of said chassis and said supply reel motor, said ring cam having a cam groove, said tape cartridge being put into a reel hub locked state where a reel hub of said supply reel is locked by a reel hub lock mechanism to stop rotation of said supply reel when said tape cartridge is not inserted in said slot, said reel hub lock mechanism including a lock lever for enabling to release a reel hub lock by operating said lock lever from the exterior, said reel hub lock releasing mechanism being for releasing the reel hub lock by operating said lock lever in response to rotation of said ring cam when said tape cartridge is inserted in said slot, said reel hub lock releasing mechanism comprising:

a seesaw-type release lever rotatably disposed on the back surface of said chassis around a fulcrum part at a center thereof, said seesaw-type release lever comprising first and second plate bodies extending from said fulcrum part toward both sides, said first plate body having, at a tip thereof, an engaging projection engaged with the cam groove of said ring cam, said second plate body having, at a tip thereof, a lever operating projection which projects upward to operate said lock lever.

2. A reel hub lock releasing mechanism as claimed in claim 1, wherein further comprises a spring, disposed around said fulcrum part, for preventing a part from falling away to fit said seesaw-type release lever to said chassis.

3. A tape drive comprising:

a chassis having a main surface and a back surface;

a take-up reel rotatably mounted on the main surface of said chassis;

a take-up reel motor, mounted on the back surface of said chassis, for rotatably driving said take-up reel;

a slot, disposed on the main surface of said chassis, for inserting a tape cartridge containing a supply reel;

a supply reel motor, mounted on the back surface of said chassis at a position opposed to said slot, for rotatably driving said supply reel in said tape cartridge, said tape cartridge being put into a reel hub locked state where a reel hub of said supply reel is locked by a reel hub lock mechanism to stop rotation of said supply reel when said tape cartridge is not inserted in said slot, said reel hub lock mechanism including a lock lever for enabling to release a reel hub lock by operating said lock lever from the exterior;

a loading mechanism for engaging said supply reel with said supply reel motor after said tape cartridge is inserted in said slot, said loading mechanism including a loading motor disposed on said chassis and a ring cam operatively driven by said loading motor, said ring cam being coaxial with a rotation axis of said supply reel motor, said ring cam being rotatably disposed between the back surface of said chassis and said supply reel motor, said ring cam having a cam groove; and     a reel hub lock releasing mechanism for releasing the reel hub lock by operating said lock lever in response to rotation of said ring cam when said tape cartridge is inserted in said slot, said reel hub lock releasing mechanism comprising a seesaw-type release lever rotatably disposed on the back surface of said chassis around a fulcrum part at a center thereof, said seesaw-type release lever comprising first and second plate bodies extending from said fulcrum part toward both sides, said first plate body having, at a tip thereof, an engaging projection engaged with the cam groove of said ring cam, said second plate body having, at a tip thereof, a lever operating projection which projects upward to operate said lock lever.

4. A tape drive as claimed in claim 3, wherein said reel hub lock releasing mechanism further comprises a spring, disposed around said fulcrum part, for preventing a part from falling away to fit said seesaw-type release lever to said chassis.

\* \* \* \* \*